United States Patent [19]

Booth et al.

[11] 4,053,867
[45] Oct. 11, 1977

[54] ACOUSTIC HOLOGRAM RECONSTRUCTOR USING SURFACE ACOUSTIC WAVE DEVICES

[75] Inventors: Newell O. Booth; Ralph D. Hippenstiel, both of San Diego, Calif.

[73] Assignee: The United States of America as represented by the Secretary of the Navy, Washington, D.C.

[21] Appl. No.: 643,454

[22] Filed: Dec. 22, 1975

[51] Int. Cl.² .............................................. G01S 9/66
[52] U.S. Cl. ................................................... 340/5 H
[58] Field of Search ........................... 340/5 H, 5 MP

[56] References Cited

U.S. PATENT DOCUMENTS

| | | | |
|---|---|---|---|
| 3,719,922 | 3/1973 | Lopes, Jr. et al. | 340/5 MP |
| 3,803,606 | 4/1974 | Lebail et al. | 340/5 H |
| 3,926,367 | 12/1975 | Bond et al. | 235/181 |

Primary Examiner—Richard A. Farley
Attorney, Agent, or Firm—Richard S. Sciascia; Ervin F. Johnston; John Stan

[57] ABSTRACT

This invention relates to an acoustical hologram reconstructor using surface acoustic wave (SAW) devices, which is a major part of apparatus which converts an acoustical hologram into a focused optical image, both having a magnitude and phase. The focused image is ultimately converted to an optical image having intensity variations, which can be viewed on a TV monitor. Two parallel convolvers, implemented by surface wave devices, are required to achieve the necessary speed of signal processing. One convolver loads while the other calculates, and vice versa. Circuitry is included to perform the following three functions required to reconstruct an intensity pattern: (1) multiplication of the hologram data by a focusing correction term; (2) performance of the inverse Fourier transform; (3) squaring and summing the real and imaginary components.

3 Claims, 10 Drawing Figures

FIG. 1.

BASIC HOLOGRAPHIC ACOUSTIC IMAGING SYSTEM.

FIG. 2.

HOLOGRAM RECONSTRUCTOR CIRCUIT

*Fig. 3.* ONE-DIMENSIONAL ACOUSTIC FIELD AND ARRAY.

*Fig. 4.* REORDERING OF QUADRANTS.

*Fig. 5.* CONVOLVER CIRCUIT (IMPLEMENTATION OF EQ. 14).

FIG. 6. CHIRP-Z TRANSFORM IMPLEMENTATION.

FIG. 7. REOCCURRING $\cos \alpha n^2$ AND $\sin \alpha n^2$ COEFFICIENT GENERATION.

FIG. 8. DIGITAL GENERATION OF $\sin \alpha n^2$ AND $\cos \alpha n^2$.

FIG. 9. SURFACE WAVE DEVICE.

FIG. 10. TRANSVERSAL FILTER.

ACOUSTIC HOLOGRAM RECONSTRUCTOR USING SURFACE ACOUSTIC WAVE DEVICES

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Visibility in an ocean environment has always been a problem. The range of active underwater optical viewing is limited to a few yards. In turbid water the useful range is even shorter.

The invention described herein relates to an acoustic hologram reconstructor, a major component of a holographic acoustic imaging system, which accomplishes reconstruction of complex acoustic holograms to obtain an image of an underwater scene. In brief, the data input from this reconstructor is a two-dimensional array of complex numbers which may be represented, digitally or in analog form, as a set of voltages stored on capacitors, which form the complex acoustic hologram. The device performs a two-dimensional Fresnel transform (focused Fourier transform) yielding a video type signal, an intensity pattern, which contains the image information. A Fresnel transform is similar to a conventional Fourier transform, but it includes a focusing correction term, to compensate for the distortion due to the acoustic signal source being too close to the hydrophone array from which the acoustical hologram is developed.

Acoustic imaging is a means of viewing objects underwater which is useful when optical viewing is limited by either water turbidity or attenuation. It encompasses several techniques of transmitting, receiving, and processing acoustic signals to create images which resemble the objects. This description hereinbelow concentrates on active acoustic systems, but the techniques may be extended to passive systems.

The basic goal of imaging is to display visually the intensity distribution reflected from a given scene. For those acoustic systems using sensitive hydrophone transducers, this requires four basic functions: acoustic-to-electronic transduction, spatial processing, detection, and display. The three basic types of acoustic imaging systems — focused, beamformed, and holographic— differ in the order in which the first three functions are performed.

For focused acoustic imaging, the functions are performed in this order: spatial processing, transduction, detection, and display. The spatial processing is accomplished with an acoustic lens and the transduction is done with a hydrophone array. The signal at each element of the array comes from a different angle in the field of view and is sensed with a square law detector to determine the intensity at that angle. Focused acoustic imaging systems differ in the ways in which the complexity is reduced by the use of smaller arrays with fewer detectors and by means of scanning the image or the array.

Beamformed systems perform the transduction of the acoustic signal first, with spatial processing and detection following in order. The spatial processing is achieved with various delaying and summing networks. The way in which the time delays and sums are implemented depends upon the acoustic frequency and the technological state-of-the-art. Three basic types of beamformed systems are evident: multiple beam, mechanically scanned beam, and electrically scanned beam. The differences between the systems occur from trade-offs between hardware complexity and time. Multiple beam systems are complex, but they are able to form a full image at one time, allowing flexible signal-to-noise gain through integration in the detectors. Scanned beamformers achieve simplicity by looking at only one beam at any given time. In order to achieve signal-to-noise gain through integration over time, the scanner must stay on a given beam longer, increasing the time required to obtain an image. During this time energy coming from other beams is being ignored, resulting in a decrease in efficiency.

For holographic acoustic imaging (FIG. 1) transduction is followed by detection and then spatial processing. In order to accomplish the spatial processing, the detectors must obtain amplitude and phase information from the signal at each hydrophone. This is accomplished by a channel processor with an electronic reference wave input.

At each hydrophone of the hydrophone array, a complex signal is sensed, that is a signal having an amplitude and a phase angle. The channel processor changes the acoustic signal into an electrical signal which is also complex.

Spatial processing is achieved by a reconstructor which can be implemented by various means. Synthetic aperture holographic systems and filled-array systems differ in the trade-off between complexity and time. With synthetic aperture systems, the amplitude and phase from only a portion of the acoustic field are measured at any given time. The acoustic field is scanned, either electrically or mechanically, and the holographic data is stored from scan to scan for reconstruction, when data from the entire field is obtained.

Summarizing the comparison, each of the three methods of acoustic imaging is likely to perform best for a specific application. Focused imaging systems are preferable at acoustic frequencies above 1 MHz where the short wavelength allows small lenses and short focal lengths. At these high frequencies, the scale lengths are so small that there is no room for the electronics presently required for holographic systems. With further development, forms of electrically scanned beamformed systems may become competitive. At lower frequencies the scale lengths are so large that focused systems are cumbersome. Then holographic systems and scanned beamformed systems become desirable. Multiple beamformed acoustic imaging systems would be cumbersome to build because of the many interconnections required for spatial processing. ($N^2$ connections from each element of an $N \times N$ array are required to form $N^2$ beams.) For holographic systems, $N^2$ parallel channel processors measure holographic data. The complex spatial processing is done in the reconstruction process. Holographic systems also offer greater flexibility in post-detection processing, or image enhancement. This is particularly relevant to acoustic imaging, when low-resolution images of mirror-like targets are difficult to recognize.

SUMMARY OF THE INVENTION

This invention relates to a hologram reconstructor, which is part of a system for converting an acoustical hologram developed from a square acoustic image comprising $N^2$ elements, into a focused optical image.

Means are provided for accepting a stream of electrical input data, A cos $\phi$ and A sin $\phi$, developed from the acoustic image, A being an amplitude and $\phi$ being a phase angle, both being a function of the slant distance from a point acoustic source to each one of the transducers located in an array. One output of this means is the discrete signal $U_s(nl,ml)$, $m=n=0,1,\ldots,N-1$, $l = (L/N) =$ the spacing between the hydrophones, another output of the means being the quantity Z.

A memory, connected to and which receives the $U_s(nl,ml)$ signal from the input data means, stores the $N^2$ discrete values of the signal $U_s(nl,ml)$.

Means are connected to the memory for controlling the movement of the stream of electrical input data.

A first function generator, whose input is connected to the input data means and the output of the controlling means generates the signals cos $\alpha n^2$ and sin $\alpha n^2$, the term $\alpha$ includes a focussing term for the X or Y dimensions of the transducer array. It corrects for near-field phase curvature.

A second function generator generates the two functions sin $(\pi/N)$ $k^2$ and cos $(\pi/N)$ $k^2$, $k = 0, 1, \ldots, N-1$.

A pair of convolvers, whose inputs are connected to the outputs of the controlling means and the two function generators, convolve the input signals. The controlling means cause a row-by-row flow of a continuous stream of Fourier coefficients from the two convolvers. The coefficients are written back into memory, read out column-by-column, and fed back into the convolvers, to be transformed into two-dimensional Fourier transform coefficients. The controlling means also selects the proper $\alpha$ in the focusing term (X or Y correction).

A squaring and summing circuit, whose input is connected to the output of the controlling means, accepts the Fourier-transformed coefficients from the two convolvers, where they are converted into $N^2$ optical intensity signals in a square array of N rows and N columns. The hologram reconstructor would generally further comprise a reordering circuit, which rearranges the $N^2$ intensity signals in the square array so that the $N^2/4$ data points in the upper left quadrant are transferred to the lower right quadrant of a new square array, the other three quadrants being arranged in a clockwise order about the original and transposed quadrants. A display, for example a television screen, displays an intensity pattern which corresponds to the acoustical hologram.

STATEMENT OF THE OBJECTS OF THE INVENTION

An object of the invention is to provide an acoustic hologram reconstructor, a major part of apparatus which converts an acoustical hologram into a focussed optical image.

Another object of the invention is to provide such an acoustic hologram reconstructor which does not involve use of a minicomputer.

Still another object of the invention is to provide an acoustical hologram reconstructor which has a defocussing correction term, due to the nearness of the acoustic signal to the hydrophones of the array.

Other objects, advantages and novel features of the invention will become apparent from the following detailed description of the invention when considered in conjunction with the accompanying drawings.

DESCRIPTION OF THE PREFERRED EMBODIMENTS

Figure 1:
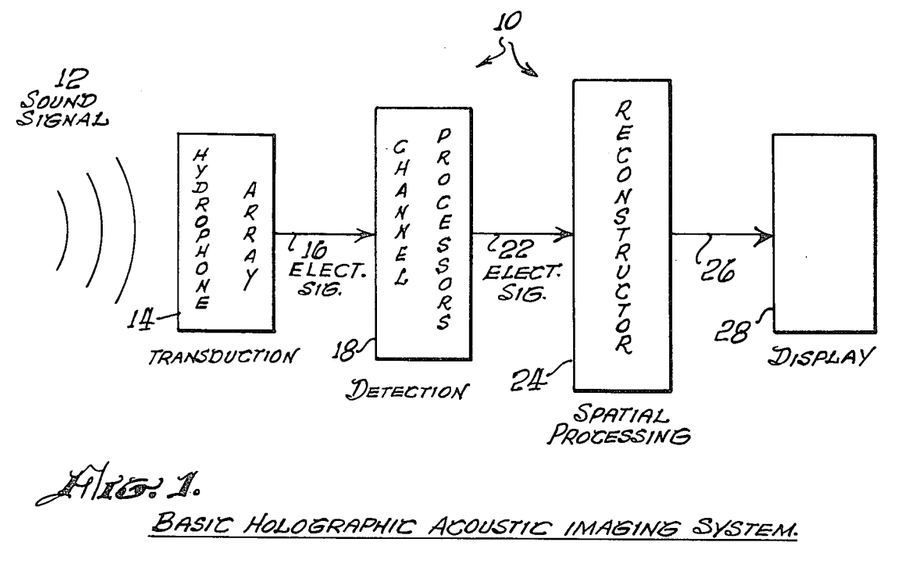
FIG. 1 is a block diagram of a basic holographic acoustic imaging system.

FIG. 1 shows a simplified block diagram of the basic holographic acoustic imaging system 10 utilizing the hologram reconstructor 24 of this invention. A sound signal 12 is picked up by a hydrophone array 14, whose output is an electrical signal 16. The signal at 16 is converted by channel processor 18 into an electrical signal at 22. A hologram reconstructor 24 converts the input signal at 22 into an intensity image at its output 26. A display 28 displays the intensity image.

Figure 2:
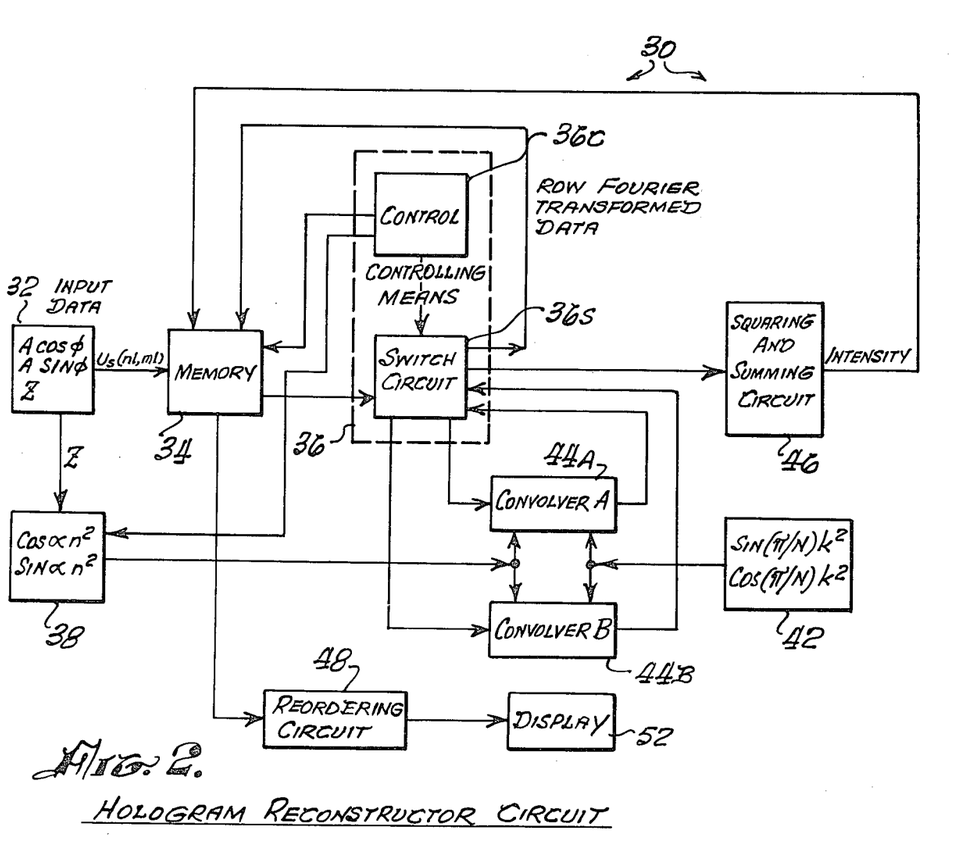
FIG. 2 is a block diagram of the hologram reconstructor circuit of this invention.

Referring now to FIG. 2, therein is shown a hologram reconstructor 30, which is part of a system (10 in FIG. 1) for converting an acoustical hologram developed from a square acoustic image comprising $N^2$ elements, into a focused optical image.

Figure 5:
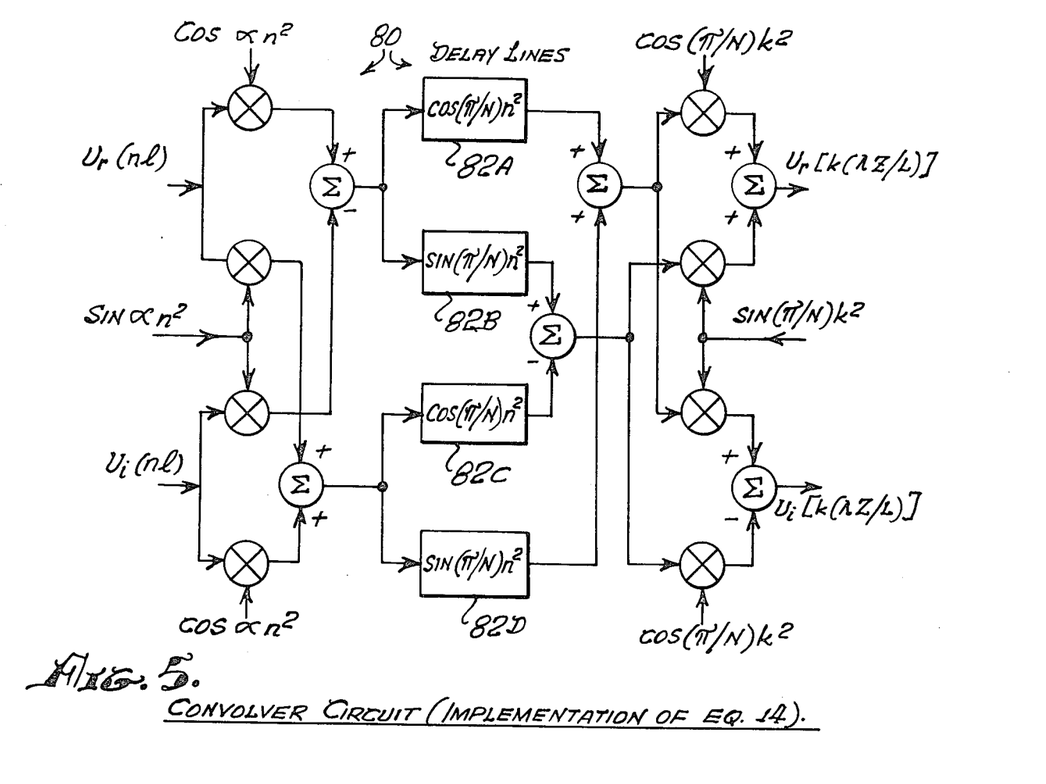
FIG. 5 is a block diagram of the convolver circuit used in the hologram reconstructor of this invention.

Means 32 are provided for accepting a stream of electrical input data, A cos $\phi$ and A sin $\phi$, developed from the acoustic image, A being an amplitude and $\phi$ being a phase angle, both being a function of the slant distance from a point acoustic source to each one of the transducers located in an array. Some of these parameters are shown in FIG. 5. One output of means 32 is the discrete signal $U_s(nl,ml)$, $m=n=0,1,2,\ldots,N-1$, $l = L/N =$ the spacing between the hydrophones, another output of the means being the quantity Z, the distance from the source to the hydrophone array. The mathematical relationships of these parameters are described hereinbelow.

A memory 34 is connected to, and receives the $U_s(nl,ml)$ signal from, the input data means 32. It stores the $N^2$ discrete values of the signal $U_s(nl,ml)$.

Means 36 are connected to the memory 34, for controlling the movement of the stream of electrical input data from means 32.

A first function generator 38, whose input is connected to the input data means 32 and controlling means 36C generates the signals cos $\alpha n^2$ and sin $\alpha n^2$. The term $\alpha$ includes a focussing term for the X or Y dimension of the transducer array. It corrects for near-field phase curvature.

A second function generator 42, generates the two functions sin $(\pi/N)$ $k^2$ and cos $(\pi/N)$ $k^2$, $k = 0,1,2,\ldots, N-1$.

A pair of convolvers 44A and 44B, whose inputs are connected to the outputs of the controlling means 36 and the function generators, 38 and 42, convolve the input signals. The controlling means 36 causes a row-by-row flow of a continuous stream of Fourier coefficients from the two convolvers, 44A and 44B. The coefficients are written back into memory 34, read out column-by-column, and fed back into the convolvers, 44A and 44B, to be transformed into two-dimensional Fourier transform coefficients.

FIG. 2 shows an embodiment 30 using two convolvers, 44A and 44B. One convolver loads while the other computes. A reconstructor circuit using only one convolver would have similar circuitry but would be slower in operation, since it would have to both load and compute.

The signals will be processed once as controlled by controlling means 36 to result in a focused Fourier transform in one dimension, a row or column. In the arrangement 30 shown in FIG. 2, row transformation is accomplished first. The controlling means 36 then sends the signal to memory 34. Another row is then processed, and the result stored in the memory 34, again under direction of the controlling means 36, until all the rows are transformed and stored in the memory. The same process is then repeated for each column. The operation is completed when the focus-corrected two-dimensional Fourier transform is stored in memory.

A squaring and summing circuit 46, whose input is connected to the output of the controlling means 36, accepts the Fourier-transformed coefficients from the two convolvers, 44A and 44B. They are there converted into $N^2$ intensity signals which are stored in the memory 34, in a square array of N rows and N columns.

The hologram reconstructor 30, according to FIG. 2, may further comprise a reordering circuit 48, which rearranges the $N^2$ intensity signals in the square array 72 (FIG. 4) so that the $N^2/4$ data points in the upper left quadrant 74 are transferred to the lower right quadrant 76 of the new square array 78. The other three quadrants are arranged in a clockwise order about the original and transposed quadrants, 72 and 78. Referring back to FIG. 2, a display 52 displays an intensity pattern which corresponds to the acoustical hologram. The upper left square 74 in FIG. 4 represents a configuration of transformed points corresponding to points 62 in the acoustic field in FIG. 3, however, not in the same spatial configuration. These points have to be reordered, as shown in the right squares 78 of FIG. 4, so that the intensity field corresponds to the acoustic pressure field 12 shown in FIG. 1.

For example, a point source in center of the acoustic field 12 in FIG. 1, after Fourier transformation, would appear in the left square 72 of FIG. 4 as a square array of numbers which have appreciable amplitude in the four corners only, three of which are designated by the pairs of letters *aa, ee,* and *ll*. After the quadrants are reordered, the points would appear in the intensity image also in the center of the square 78, as it appeared in the pressure pattern 12.

A typical convolver circuit 80 is shown in FIG. 5. This invention is a circuit that will convert an acoustical hologram into a focused image. This requires a two-dimensional Fourier transformation and compensation for proper focusing in the Fresnel zone. The circuit uses a surface wave device (SWD), which is the best compromise of today's technology. Other devices and methods are also discussed, hereinbelow.

Discussing now the mathematical bases for the invention, the hologram, as generated, contains both amplitude and phase information. For the purpose of illustration, a one-dimensional analysis, which can be easily extended to the two-dimensional case, will be sufficient.

Figure 3:
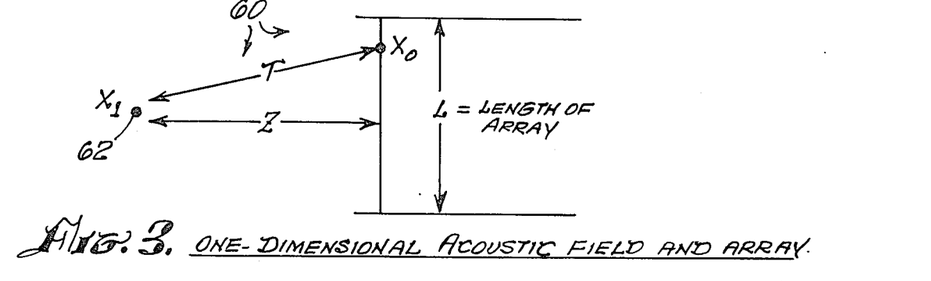
FIG. 3 is a diagram of a one-dimensional acoustic field and array.
Figure 4:
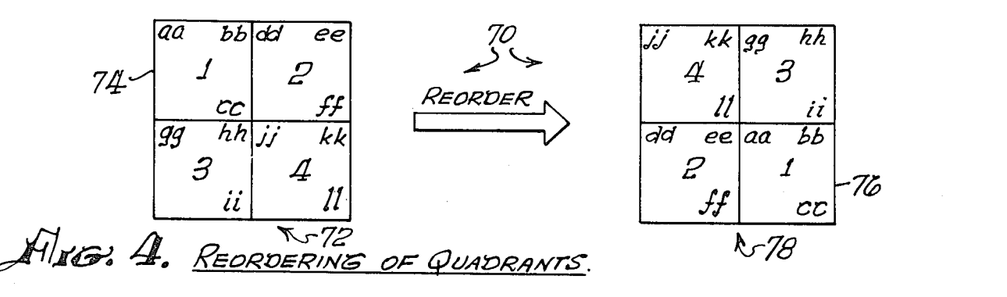
FIG. 4 is a diagram showing the manner in which quadrants which store Fourier coefficients developed from the acoustic image have to be reordered to obtain an optical image which corresponds to the acoustic image.

Referring first to FIG. 3, assuming a point source at point $X_1$, the field at an arbitrary point $X_0$ is as shown. In the specific implementation 10 shown in FIG. 1, the field is an acoustic pressure field 12.

$$U(X_0) = \int_{-\infty}^{\infty} U(X_1) \frac{e^{jk\tau}}{j\lambda\tau} dX_1 \quad (1)$$

Using paraxial approximation this becomes $$U(X_0) = \frac{1}{j\lambda Z} \int_{-\infty}^{\infty} U(X_1) e^{jkZ} \left[ 1 + \frac{1}{2}\left(\frac{X_0 - X_1}{Z}\right)^2 \right] dX_1 \quad (2)$$

(Z is large relative to both the array width and the off-axis distance of X.)

$$= \frac{e^{jkZ}}{j\lambda Z} e^{j\frac{k}{2Z} X_0^2} \int_{-\infty}^{\infty} U(X_1) e^{j\frac{k}{2Z} X_1^2} e^{-j\frac{k}{Z} X_0 X_1} dX_1 \quad (3)$$

Let $$\frac{e^{jkZ}}{j\lambda Z} = C_1, \quad U(X_1)e^{j\frac{k}{2Z} X_1^2} = U'(X_1), \quad (4)$$

then $$U(X_0) = C_1 e^{j\frac{\pi}{\lambda Z} X_0^2} \int_{-\infty}^{\infty} U'(X_1) e^{-j2\pi \frac{X_0}{\lambda Z} X_1} dX_1 \quad (5a)$$

$$= C_1 e^{j\frac{\pi}{\lambda Z} X_0^2} F\{U'(X_1)\}, \quad (5b)$$

where F designates the Fourier transform.

To obtain the amplitude of the image (multiplied by a constant phase term) it is obvious that all that is needed is the relationship:

$$U'(X_1) = \frac{1}{C_1} \int_{-\infty}^{\infty} e^{-j\frac{\pi}{\lambda Z} X_0^2} U(X_0) e^{j2\pi \frac{X_0}{\lambda Z} X_1} d\left(\frac{X_0}{\lambda Z}\right) \quad (6a)$$

$$= \frac{1}{C_1} F^{-1}\left\{ e^{-j\frac{\pi}{\lambda Z} X_0^2} U(X_0) \right\} \quad (6b)$$

$$= U(X_1) e^{j\frac{k}{2Z} X_1^2} \quad (6c)$$

Here $F^{-1}$ designates the inverse Fourier transform.

The ultimate goal is to obtain the intensity at $X_1$. This is $$I(X_1) = |U'(X_1)|^2 = U'(X_1)U'^{\oplus}(X_1) \quad (7a)$$

$$= U(X_1)e^{j\frac{k}{2Z} X_1^2} U^{\oplus}(X_1) e^{-j\frac{k}{2Z} X_1^2}, \quad (7b)$$

by use of Eq. (4). Therefore $$I(X_1) = U(X_1)U^{\oplus}(X_1) \quad (7c)$$

$$= |U(X_1)|^2. \quad (7d)$$

where ⊕ is the complex conjugate. That is to say, the intensity of a point source located at $X_1$ equals the square of the magnitude of the field amplitude at that point.

Thus, the three functions required to reconstruct an intensity pattern are:

1. Multiplication of the hologram data by a focusing correction term, the exponential term in Eq. 6b;
2. Performance of the inverse Fourier transform, in Eq. 6b; and
3. Squaring and summing the real and imaginary components, Eq. 7d.

Since the data are available at discrete points only ($X_0 = nl, n = 0, 1, \ldots, N-1$) the signal is of the form $$U_s(nl) = \sum_{n=0}^{N-1} U(X_0)\delta\left(\frac{X_0}{l} - n\right), \quad (8)$$

where $l = L/N$ = spacing of hydrophones. It is assumed that each hydrophone receives only at a point, as indicated by the delta function.

In general, discrete Fourier transform (DFT) pairs are of the form $$G\left(\frac{n}{NT}\right) = \sum_{k=0}^{N-1} g(kT)e^{-j2\pi\frac{nk}{N}} \quad (9)$$

$$g(kT) = \frac{1}{N}\sum_{n=0}^{N-1} G\left(\frac{n}{NT}\right)e^{j2\pi\frac{nk}{N}} \quad (10)$$

In this case, $$\frac{1}{NT} = \frac{l}{\lambda Z} \text{ and } T = \frac{\lambda Z}{L}, \text{ since } l = L/N. \quad (11)$$

Hence, $$U\left(k\frac{\lambda Z}{L}\right) = \frac{1}{N}\sum_{n=0}^{N-1} U\left(\frac{nl}{\lambda Z}\right)e^{j2\pi\frac{nk}{N}}, \quad (12)$$

by use of Eq. 10.

or $$F^{-1}\left\{U_s(nl)e^{-j\frac{\pi}{\lambda Z}(nl)^2}\right\} \quad (13a)$$

$$= \frac{1}{N}\sum_{n=0}^{N-1} U_s(nl)e^{-j\frac{\pi l^2}{\lambda Z}n^2}e^{j2\pi\frac{nk}{N}}$$

$$= \frac{1}{N}e^{j\frac{\pi}{N}k^2}\sum_{n=0}^{N-1} U_s(nl)e^{j\frac{\pi}{N}\left(1-\frac{lL}{\lambda Z}\right)n^2}e^{-j\frac{\pi}{N}(n-k)^2} \quad (13b)$$

$$= \frac{1}{N}e^{j\frac{\pi}{N}k^2}\left[\left(U_s(nl)e^{j\frac{\pi}{N}\left(1-\frac{lL}{\lambda Z}\right)n^2}\right)*e^{-j\frac{\pi}{N}n^2}\right] \quad (13c)$$

From Eq. (13c), Eq. (14) may be obtained.

$$F_{discrete}^{-1}\left\{U_s(nl)e^{-j\frac{\pi}{\lambda Z}(nl)^2}\right\}$$

$$(\cos\frac{\pi}{N}k^2 + j\sin\frac{\pi}{N}k^2)(U_s(nl)\cos\alpha n^2)*\cos\frac{\pi}{N}n^2$$

$$= \begin{bmatrix} + (\sin\frac{\pi}{N}k^2 - j\cos\frac{\pi}{N}k^2)(U_s(nl)\cos\alpha n^2)*\sin\frac{\pi}{N}n^2 \\ + (-\sin\frac{\pi}{N}k^2 + j\cos\frac{\pi}{N}k^2)(U_s(nl)\cos\alpha n^2)*\cos\frac{\pi}{N}n^2 \\ + (\cos\frac{\pi}{N}k^2 + j\sin\frac{\pi}{N}k^2)(U_s(nl)\cos\alpha n^2)*\sin\frac{\pi}{N}n^2 \\ + (-\sin\frac{\pi}{N}k^2 + j\cos\frac{\pi}{N}k^2)(U_s(nl)\sin\alpha n^2)*\cos\frac{\pi}{N}n^2 \\ + (\cos\frac{\pi}{N}k^2 + j\sin\frac{\pi}{N}k^2)(U_s(nl)\sin\alpha n^2)*\sin\frac{\pi}{N}n^2 \\ + (-\cos\frac{\pi}{N}k^2 - j\sin\frac{\pi}{N}k^2)(U_s(nl)\sin\alpha n^2)*\cos\frac{\pi}{N}n^2 \\ + (-\sin\frac{\pi}{N}k^2 + j\cos\frac{\pi}{N}k^2)(U_s(nl)\sin\alpha n^2)*\sin\frac{\pi}{N}n^2 \end{bmatrix}$$

where * denotes convolution

FIG. 5 shows the actual composition of the convolver 80. The length of each delay line, 82A – 82D, must be $2N-1$, where N is the number of Fourier coefficients or terms. Two convolvers must operate in parallel: One computes while the other one loads, and vice versa. This is required by the circular convolution employed, in the embodiment shown. Circular convolution has the advantage of performing the convolution with N steps; regular convolution would require $2N-1$ steps. Circular convolution is, however, only possible when N is an even number (N being the number of hydrophones or Fourier coefficients).

The term $\alpha$, in Eq. 14 and Table 1, is a function of Z, the distance to the point source X, as shown in FIG. 3. For every different range Z, there is a different $\alpha$. The term $\alpha$ is very precisely defined in FIG. 6. For a square array of $N^2$ transducers $\alpha$ remains the same for the column and row transformation.

The two-dimensional case is an extension of the one-dimensional case. When an approach such as the fast Fourier transform (FFT) is used, that is, transforming row by row and column by column, then the same circuit can be used to perform the row and column transformations. The circuit in FIG. 2 performs the row transformation first and then the column transformation.

As is shown in FIG. 2, the data available to the input of the hologram reconstructor are $A \cos\phi$, $A \sin\phi$, and Z. A is an amplitude, $\phi$ is the phase angle with respect to a reference signal. The memory 34 will store the data of the hologram. The control 36C, in conjunction with the switching circuit 36S, that is controlling means 36, will read-out row by row so that a continuous stream of Fourier coefficients is extracted from the two convolvers, 44A and 44B. At the same time the control 36C will return the coefficients of the row transformation back to the memory 34. After processing all rows, the control and switching circuit 36 will read-out column by column and feed data to the convolvers, 44A and 44B. The controlling means 36C will also select the proper focusing term for the row and column transformation. For the square array with $N^2$ elements the focusing term remains the same during both transformations. The convolvers, 44A and 44B, will now output the two-dimensional Fourier transform coefficients.

At this time the control 36C will allow the coefficients to pass to the squaring and summing circuit 46, where the complex signal will be converted into intensity. The intensity coefficients will be fed back to the correct place in memory 34. This leaves only the reordering, shown in FIG. 4, to be performed; the process is necessary because of the spatial sequence of the Fourier coefficients. The reordering can be accomplished off-line so that the reconstruction circuit computes the Fourier transforms for the next image while the reordering circuit 48 aligns the picture to the proper composition.

Figure 6:
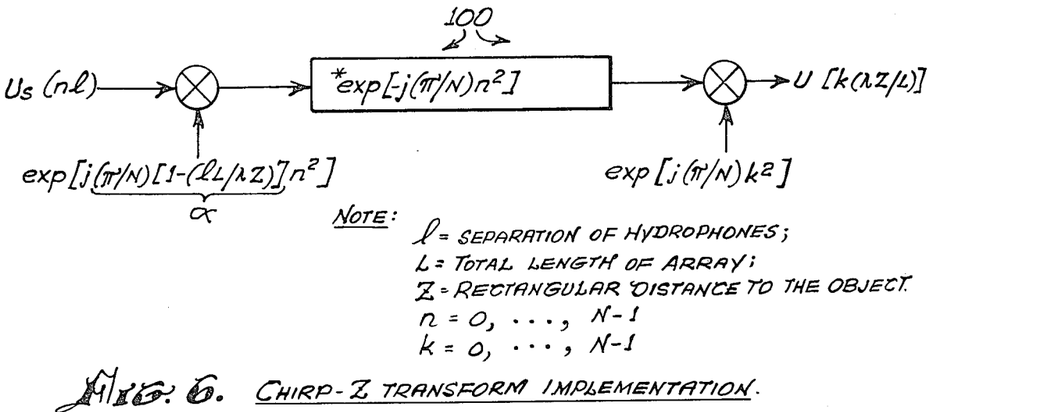
FIG. 6 is a basic implementation of a chirp-Z transform, similar to the more detailed implementation shown in FIG. 5.

As may be seen from the embodiment 100, shown in FIG. 6, the coefficient $\alpha$ is a function of Z, the range to the object (see FIG. 3):

$$\alpha = \frac{\pi}{N}\left(1 - \frac{lL}{\lambda Z}\right); \quad \text{for the square array } \alpha \text{ remains the same for the row and column transformation.} \tag{15}$$

Two signals of the form $\sin \alpha n^2$ and $\cos \alpha n^2$ are not easily generated because of the required 90° phase shift between the two sinusoidal signals. The generator discussed hereinbelow will generate both signals recursively.

$$\cos n^2\alpha = \cos(m+1)^2\alpha \tag{16a}$$
$$= \cos(m^2+2m+1)\alpha, \tag{16b}$$
$$\text{where } n = m+1. \tag{17}$$
$$\cos(m+1)^2\alpha = \cos m^2\alpha \cos(2m+1)\alpha - \sin m^2\alpha \sin(2m+1)\alpha \tag{18}$$
$$\sin(m+1)^2\alpha = \sin m^2\alpha \cos(2m+1)\alpha + \cos m^2\alpha \sin(2m+1)\alpha \tag{19}$$
$$\cos(2m+1)\alpha = \cos(2m-1+2)\alpha$$
$$= \cos(2m-1)\alpha \cos 2\alpha - \sin(2m-1)\alpha \sin 2\alpha \tag{20}$$
$$\sin(2m+1)\alpha = \sin(2m-1)\alpha \cos 2\alpha + \cos(2m-1)\alpha \sin 2\alpha \tag{21}$$

Figure 7:
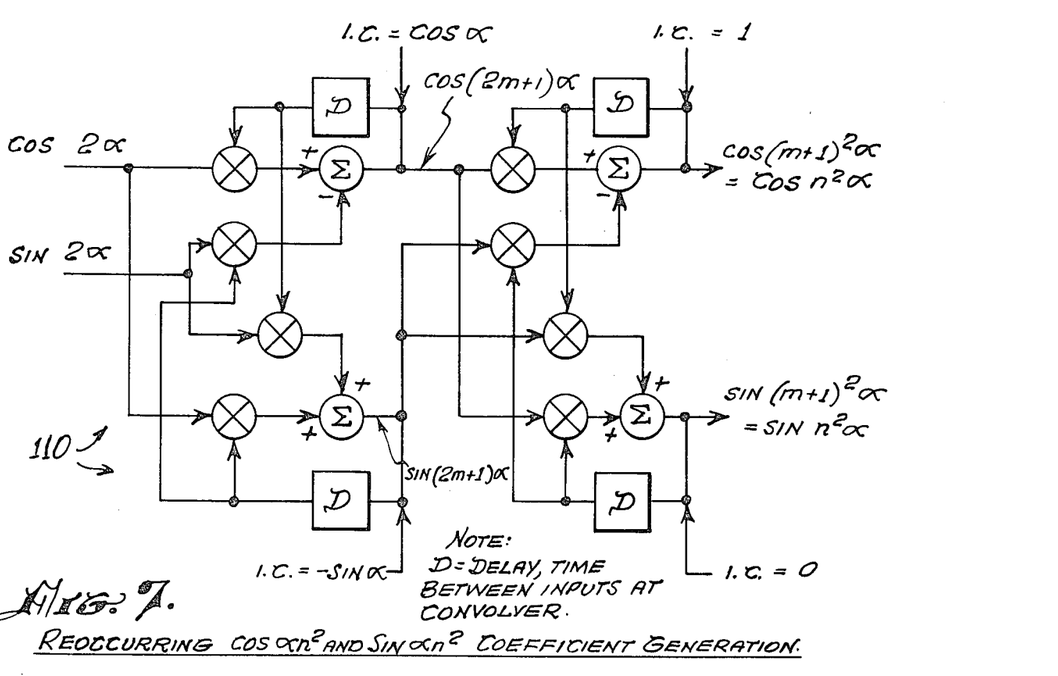
FIG. 7 is a block diagram of apparatus for the generation of output signals cos $\alpha$ $n^2$ and sin $\alpha$ $n^2$ from inputs cos 2 $\alpha$ and sin 2 $\alpha$.

FIG. 7 shows the hardware implementation, and initial conditions for the circuits are indicated in Table 1. There are several ways to optimize this circuit 110. One is to build half the circuit 110 and use it two times (multiplex), once to generate $_{cos}^{sin}(2m+1)\alpha$ and the second to generate $_{cos}^{sin}(m+1)^2\alpha$. The term $_{cos}^{sin}(2M+1)$ indicates both $\sin(2m+1)$ or $\cos(2m+1)$, generated simultaneously.

Figure 8:
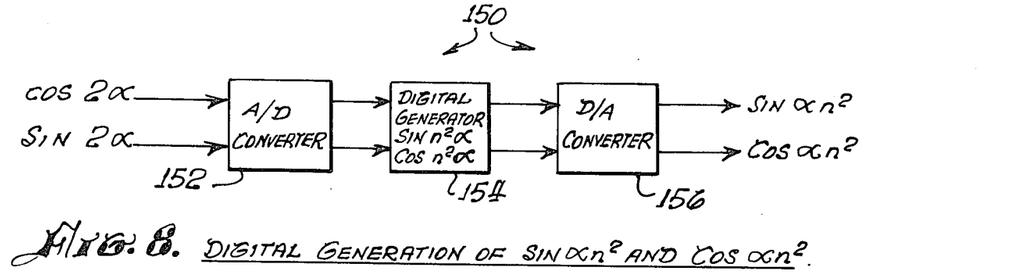
FIG. 8 is a block diagram of apparatus for generating the same output signals in a digital manner.

Another version is to convert the circuit 150 in FIG. 8 into a digital form, using A/D converter 152 and then use a digital-to-analog (D/A) converter 156 to generate the required analog signal. This discrete implementation 150 allows simple circuitry for delay, multiplication, and addition. The only distortion is caused by the finite word length.

The embodiment 150 shown in FIG. 8 uses a digital generator similar to the analog generator 110 shown in FIG. 7. It has the great advantage that the timing of the various signals involved is much simpler than in an analog system because a very accurate clock may be used, whereas in analog systems accurate synchronizing of delay lines are very hard to implement.

A convolver using surface wave devices has been developed which can accommodate 32 data points and perform a Fourier transform in 6.69 microseconds, or approximately 0.21 microsecond per discrete Fourier transform. As mentioned hereinabove, it is necessary to use two convolvers in parallel to achieve this speed: One convolver loads while the other calculates, and vice versa. The parallel arrangement and the use of $2N-1$ taps (where N is the number of data points) allows a computation time that is proportional to N.

For a 20 by 20 array, the computation will be approximately $$\begin{aligned} \text{time} &= 2\,N^2(\Delta t) \quad \Delta t = \text{time for }\Delta\text{ DFT} \\ &= 2 \cdot 20^2 (0.21 \cdot 10^{-6}) \simeq 1.68 \cdot 10^{-4}\text{ seconds} \\ &\text{For a } 96 \times 96 \text{ array,} \\ \text{time} &= 2 \cdot 96^2 (0.21 \cdot 10^{-6}) \simeq 3.87 \cdot 10^{-3}\text{ seconds.} \end{aligned} \tag{22}$$

Figure 9:
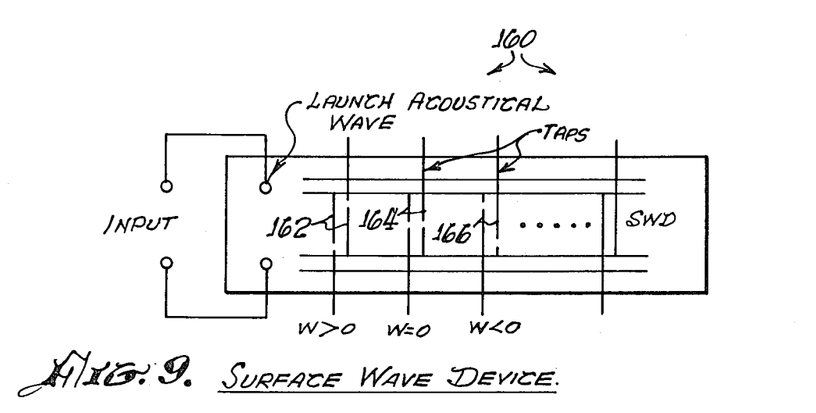
FIG. 9 is a diagram of a surface wave device, such as may be used in this invention.
Figure 10:
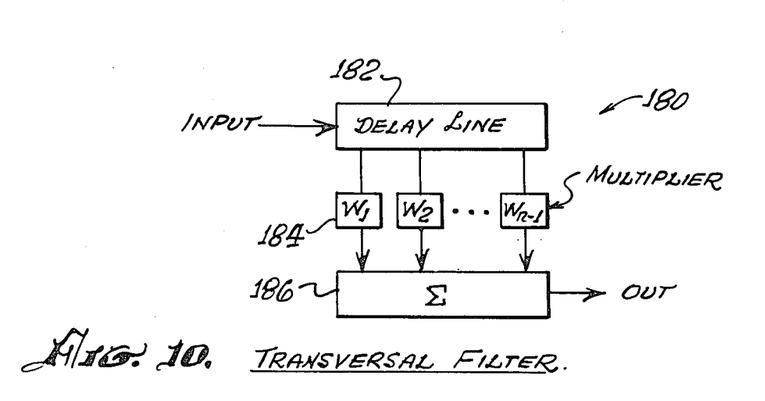
FIG. 10 is a prior art simplified block diagram of a transversal filter.

These time estimates do not include the time for control or for the required reordering of the intensity matrix. The former should be approximately the time required for the DFT, and the time for the latter depends on memory organization. The surface wave device (SWD), as used for the convolver, is an acoustical delay line, 160 in FIG. 9. At fixed points along this delay line are taps, 162, 164 and 166, that sense the signal as it passes. Depending on tap layout and referencing, the signal will be scaled by a number between $-1$ and $+1$. This number represents the weight or multiplication factor of the tap. All taps are fed-out separately, as indicated in the embodiment 180 shown in FIG. 10. The addition of a summer 186 to the delay line 182 results in a transversal filter 180.

The objective of reconstructing acoustic holograms can also be accomplished with charge coupled devices and bucket brigade devices.

Obviously many modifications and variations of the present invention are possible in the light of the above teachings. It is therefore to be understood that within the scope of the appended claims the invention may be practiced otherwise than as specifically described.

What is claimed is:

1. A hologram reconstructor, which is part of a system for converting an acoustical hologram developed from a square acoustic image comprising $N^2$ elements, into a focused optical image, the square having a side of length L, comprising:

means for accepting a stream of electrical input data, $A \cos \phi$ and $A \sin \phi$ developed from the acoustic image, A being an amplitude and $\phi$ being a phase angle, both being a function of Z, the distance from a point acoustic source to the plane of $N^2$ transducers located in an array perpendicular to Z, one output of this means being the discrete signal

TABLE 1.

| | | OUTPUTS ASSOCIATED WITH COEFFICIENT GENERATOR | | | |
|---|---|---|---|---|---|
| n | m | $\cos(2m+1)\alpha$ | $\sin(2m+1)\alpha$ | $\cos(m+1)^2\alpha$ | $\sin(m+1)^2\alpha$ |
| 0 | −1 | $\cos \alpha$ | $-\sin \alpha$ | 1 | 0 |
| 1 | 0 | $\cos 2\alpha \cos \alpha + \sin 2\alpha \sin \alpha = \cos \alpha$ | $\sin 2\alpha \cos \alpha - \cos 2\alpha \sin \alpha = \sin \alpha$ | $\cos \alpha = \cos 1^2\alpha$ | $\sin \alpha = \sin 1^2\alpha$ |
| 2 | 1 | $\cos 2\alpha \cos\alpha - \sin 2\alpha \sin \alpha = \cos 3\alpha$ | $\sin 2\alpha \cos \alpha + \cos 2\alpha \sin \alpha = \sin 3\alpha$ | $\cos\alpha \cos 3\alpha - \sin \alpha \sin 3\alpha = \cos 4\alpha = \cos 2^2\alpha$ | $\sin 3\alpha \cos \alpha + \sin\alpha \cos 3\alpha = \sin 4\alpha = \sin 2^2\alpha$ |
| 3 | 2 | $\cos 2\alpha \cos 3\alpha - \sin 2\alpha \sin 3\alpha = \cos 5\alpha$ | $\sin 2\alpha \cos 3\alpha + \cos 2\alpha \sin 3\alpha = \sin 5\alpha$ | $\cos 4\alpha \cos 5\alpha - \sin 4\alpha \sin 5\alpha = \cos 9\alpha = \cos 3^2\alpha$ | $\sin 5\alpha \cos 4\alpha + \sin 4\alpha \cos 5\alpha = \sin 9\alpha = \sin 3^2\alpha$ |
| 4 | 3 | $\cos 2\alpha \cos 5\alpha - \sin 2\alpha \sin 5\alpha = \cos 7\alpha$ | $\sin 2\alpha \cos 5\alpha + \cos 2\alpha \sin 5\alpha = \sin 7\alpha$ | $\cos 9\alpha \cos 7\alpha - \sin 9\alpha \sin 7\alpha = \cos 16\alpha = \cos 4^2\alpha$ | $\sin 9\alpha \cos 7\alpha + \sin 7\alpha \cos 9\alpha = \sin 16\alpha = \sin 4^2\alpha$ |
| k | k-1 | $\cos 2\alpha \cos(2k-3)\alpha - \sin 2\alpha \sin(2k-3)\alpha = \cos(2k-1)\alpha$ | $\sin(2k-1)\alpha$ | $= \cos k^2\alpha$ | $= \sin k^2\alpha$ |

$U_s(nl,ml)$, where $m=n=0,1,2,\ldots,N-1$, $l=(L/N)$ = the spacing between the hydrophones, another output of the means being the quantity Z;

a memory, connected to and which receives the $U_s(nl,ml)$, signal from, said input data means, which stores the $N^2$ discrete values of the signal $U_s(nl,ml)$;

means, connected to said memory, for controlling the movement of the stream of electrical input data;

a first function generator, whose input is connected to said input data means and said controlling means which generates the signals $\cos \alpha\, n^2$ and $\sin \alpha\, n^2$, the term $\alpha$ including a focusing term for the Z dimension of the planar array, which corrects for near-field phase curvature;

a second function generator for generating the two functions $\sin (\pi/N)\, k^2$ and $\cos (\pi/N)\, k^2$;

a pair of convolvers, whose inputs are connected to the outputs of said controlling means and said two function generators, which convolve the input signals, said controlling means causing a row-by-row flow of a continuous stream of Fourier coefficients from said two convolvers, which coefficients are written back into said memory, read out column-by-column, and fed back into said convolvers, to be transformed into two-dimensional Fourier transform coefficients; and a squaring and summing circuit, whose input is connected to the output of said controlling means, which accepts the Fourier transformed coefficients from said two convolvers, where they are converted into $N^2$ intensity signals in a square array of N rows and N columns.

2. The hologram reconstructor according to claim 1, further comprising:

a reordering circuit, the input of which is connected to said memory which rearranges the $N^2$ intensity signals in the square array so that the $N^2/4$ data points in the upper left quadrant are transferred to the lower right quadrant of the new square array, the other three quadrants being arranged in a clockwise order about the original and transposed quadrant.

3. The hologram reconstructor according to claim 2, further comprising:

a display, the input of which is connected to the output of said reordering circuit, for displaying an intensity pattern which corresponds to the acoustical hologram.

* * * * *